(12) United States Patent
Hoopes

(10) Patent No.: US 6,778,375 B1
(45) Date of Patent: Aug. 17, 2004

(54) HYBRID MOV/GAS-TUBE AC SURGE PROTECTOR FOR BUILDING ENTRANCE

(75) Inventor: Gerald B. Hoopes, Petaluma, CA (US)

(73) Assignee: Panamax, Petaluma, CA (US)

( * ) Notice: Subject to any disclaimer, the term of this patent is extended or adjusted under 35 U.S.C. 154(b) by 56 days.

(21) Appl. No.: 09/747,123

(22) Filed: Dec. 22, 2000

(51) Int. Cl.[7] .............................................. H02H 1/00
(52) U.S. Cl. ...................................... 361/120; 361/127
(58) Field of Search ................................ 361/54–56, 58, 361/103, 104, 117–120, 124–127, 111, 91.1, 93.8

(56) References Cited

U.S. PATENT DOCUMENTS

| | | | | |
|---|---|---|---|---|
| 4,677,518 A | * | 6/1987 | Hershfield | 361/56 |
| 5,388,021 A | * | 2/1995 | Stahl | 361/104 |
| 5,412,526 A | * | 5/1995 | Kapp et al. | 360/111 |
| 6,188,557 B1 | * | 2/2001 | Chaudhry | 361/111 |
| 6,226,162 B1 | * | 5/2001 | Kladar et al. | 361/56 |
| 6,226,166 B1 | * | 5/2001 | Gumley et al. | 361/118 |
| 6,282,075 B1 | * | 8/2001 | Chaudhry | 361/111 |

* cited by examiner

Primary Examiner—Brian Sircus
Assistant Examiner—Danny Nguyen

(57) ABSTRACT

A surge protector for single-phase or multi-phase power lines is disclosed, for permanent connection near the entrance of power lines to a building, that has a basic protector sub-circuit of a metal-oxide varistor (MOV) and a gas-discharge tube (GDT) connected in series between the power line and building ground. Preferably, the gas-discharge tube is a three-element GDT and is connected to two metal-oxide varistors. In a multi-phase implementation, the present invention includes one or more protector sub-circuits connected between each power line and ground, wherein each protector sub-circuit includes two metal-oxide varistors connected to a power line and a gas-discharge tube connected to the building ground.

8 Claims, 3 Drawing Sheets

HYBRID MOV/GAS-TUBE AC SURGE PROTECTOR FOR BUILDING ENTRANCE

BACKGROUND OF THE INVENTION

1. Field of the Invention

The present invention relates generally to surge protector circuits that protect electrical equipment connected to electrical lines, and relates more particularly to an alternating current (AC) building entrance surge protector circuit that uses a combination of metal-oxide varistors and gas-discharge tubes to get improved performance.

2. Description of the Relevant Art

Electrical lines, such as AC power lines, are subject to power surges of an abnormally high current and/or voltage that may be caused by lightning or short circuits. A power surge can cause permanent damage to electrical and electronic devices connected to the power line. Surge protectors have been developed to detect surges and to block the surge before it reaches devices on the power line. Roughly speaking, surge protectors are divided into two different types—permanently-wired and plug-connected.

Building-entrance surge protectors are permanently wired to power lines where they enter a building and are designed with a relatively large surge capacity. They are located where power lines enter a building so that they can protect the portions of the power lines that run inside the building as well as devices which are connected to the power lines. Another feature of building-entrance surge protectors is that, because of their location, they can be grounded directly to building ground wires, which have good connection to the Earth itself, providing excellent grounding for large surges, and, therefore, improved protection.

Plug-connected surge protectors, on the other hand, are generally located on the inside of a building, "downstream" from any building-entrance surge protector. For instance, it is common to place a plug-connected surge protector on an AC power line between a wall outlet and a computer. Because they are generally located indoors, plug-connected surge protectors are not generally required to be as rugged as building-entrance surge protectors, and typically have a lower surge current capacity.

Two factors that are important in the design and performance of a protector circuit are the turn-on voltage and limiting voltage. The turn-on voltage is the voltage at which the protector begins shunting a surge to ground, i.e., the "input" voltage that triggers the operation of the surge protector. The limiting voltage (also called "let-through" voltage) is the voltage that is passed through to the power line when the protector is shunting a surge to ground, i.e., the "output" voltage that devices downstream of the protector may experience in the event of a surge.

AC power protector circuits have an inherent design compromise: If the turn-on voltage is set low, the protector circuit will be activated by even minor over-voltages, and may wear out quickly or interfere with the power supplied to the protected devices. On the other hand, if the turn-on voltage is set high, then the limiting voltage under surge conditions will tend to be high, which is undesirable because it may damage the protected equipment.

A standard design for building-entrance AC power protectors uses metal-oxide varistors (MOVs) with a turn-on voltage of 230V. This type of protector circuit, however, has the disadvantage that the capacitance of the MOVs interferes with Power Line Carrier (PLC) communication systems that send and receive high frequency communication signals over the power lines within a building. The MOVs attenuate the high-frequency signals, thus interfering with the operation of the system. Also, this type of protector circuit typically uses fuses for the MOVs in order to pass standard safety tests.

Combinations of MOVs and gas-discharge tubes (GDTs) have been used commercially for plug-connected surge protectors that are connected by line-cord and AC plug to the building wiring system. However, protectors of this design have apparently not been used for permanently-wired building entrance AC surge protectors.

SUMMARY OF THE INVENTION

In summary, the present invention is a building-entrance surge protector for single-phase or multi-phase power lines that has a basic protector sub-circuit of a metal-oxide varistor (MOV) and a gas-discharge tube (GDT) connected in series between the power line and building ground at a location adjacent to the building entrance.

In its most fundamental form, the present invention includes (1) a metal-oxide varistor having two electrodes and being coupled at one electrode to a power line, and (2) a gas-discharge tube having a line electrode connected to the other electrode of the metal-oxide varistor and having a ground electrode connected to the building ground. Preferably, the gas-discharge tube has two line electrodes and there is a second metal-oxide varistor connected in parallel to the first metal-oxide varistor between the second gas-discharge tube electrode and the power line.

In a more complex form, the present invention includes one or more protector sub-circuits connected between each power line of multi-phase power lines, wherein each protector sub-circuit includes two metal-oxide varistors each having two electrodes and each being coupled at one electrode to a power line, and a gas-discharge tube having two line electrodes connected to the other electrodes of the metal-oxide varistors and having a ground electrode connected to the building ground at the location adjacent to the building entrance. Optionally, there is also a coupling capacitor connected between the power lines.

Basically, the present invention uses metal-oxide varistors (MOVS) and gas-discharge tubes (GDTs) in a permanently-wired, building entrance surge protector circuit intended for fixed installation across an AC service with a permanent, short connection to the building ground. The present invention eliminates series-connected thermal fuses that prior protector circuits have used to limit currents to pass standard safety tests, with consequent savings of cost and space and increased protector ratings, since the full surge absorbing capabilities of the MOVs and GDTs are utilized.

The present invention has improved turn-on voltage and surge limiting voltage, which increase the expected service life of the protector. The protector also survives, without damage, fault conditions in which AC voltage of 240VAC is applied across (normally) 120V terminals. Also, the presence of the GDTs makes it possible to pass standard safety tests without the addition of special thermal fusing circuits, and without damaging any circuit elements.

One optional feature of the present invention is the use of a three-element GDT (two line electrodes and a ground electrode) shared by two MOVs. This reduces cost and protector size, and improves the equalization of current in the various parts of the protector.

The gas-discharge tubes of the present invention also isolate the capacitance of the metal-oxide varistors from the power lines during normal (non-surge) operation, which is a significant benefit to the use of Power Line Carrier (PLC) communications because the MOVs, unlike those of prior protectors, do not attenuate the PLC signals carried in the power lines during normal operation. Optionally, the present invention can include a coupling capacitor so that PLC signals being transmitted in one power line of a multi-phase connection will be coupled to the other power line and to PLC receivers on the other power line.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENTS

The drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1:
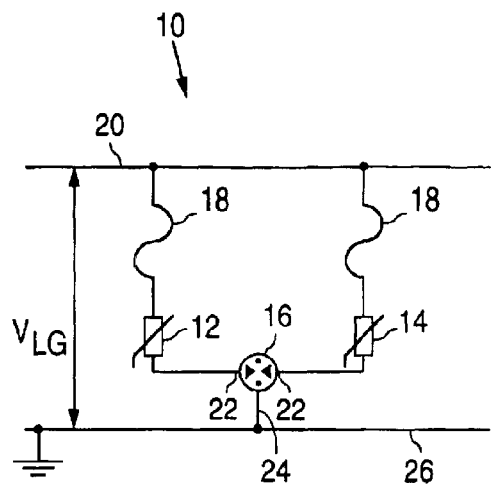
FIG. 1 is a schematic diagram of a surge protector sub-circuit that includes two metal-oxide varistors (MOVs) and a gas discharge tube (GDT) according to the present invention.

A basic protector sub-circuit 10, according to the present invention, is shown in FIG. 1. The protector 10 includes two metal-oxide varistors (MOVs) 12 and 14, and a gas-discharge tube (GDT) 16. Each MOV has two electrodes or terminals, one of which is connected through a fuse 18 to a power line 20, the other of which is connected to a line electrode or terminal 22 of the GDT 16. The GDT 16 also has a ground electrode or terminal 24 that is connected to the building ground 26. Since this is a building-entrance AC surge protector, it is located at or near the point where the power line enters a building. Preferably, the protector 10 is located within 2 meters of the building ground 26. Also preferably, the inductance between the protector 10 and the building ground 26 is less than 2.5 microhenries. Preferably, the fuses 18 are fusible printed circuit board foil traces, the MOVs 12 and 14 are Siemens part number S20K130E3, and the GDT 16 is Joslyn part number 2026-47-C4S, 470V.

The protector 10 operates in the following manner. The GDT 16 has a breakdown voltage of approximately 400V. For a voltage appearing across the line-ground terminals of under 400V peak (283V RMS, sine wave), the protector 10 conducts no current because the GDT 16 is completely nonconductive. The voltage across the GDT line and ground terminals is essentially the voltage between the power line 20 and the building ground 26 because the impedance of the MOVs 12 and 14 is much smaller than the impedance of the GDT 16.

If, however, the voltage across the incoming line and ground terminals, $V_{LG}$, exceeds 400V peak, the GDT 16 ionizes. When the gas-discharge tube 16 ionizes, it is highly conductive, so the voltage across its terminals decreases to approximately 25V, even for currents as large as many thousands of amperes. Once the GDT ionizes, the voltage across the MOVs is now $V_{LG}$-25V, which is far above the MOV turn-on voltage, so the MOVs conduct the excess electricity appearing on the power line 20 to ground through the GDT 16. The voltage across the MOV is determined by its I-V characteristic and the amount of current available from the power surge on the power line. The voltage across the protector L-G terminals (i.e., the effective limiting voltage seen by the load) will be about 25 volts greater than the voltage across the MOV.

Figure 2:
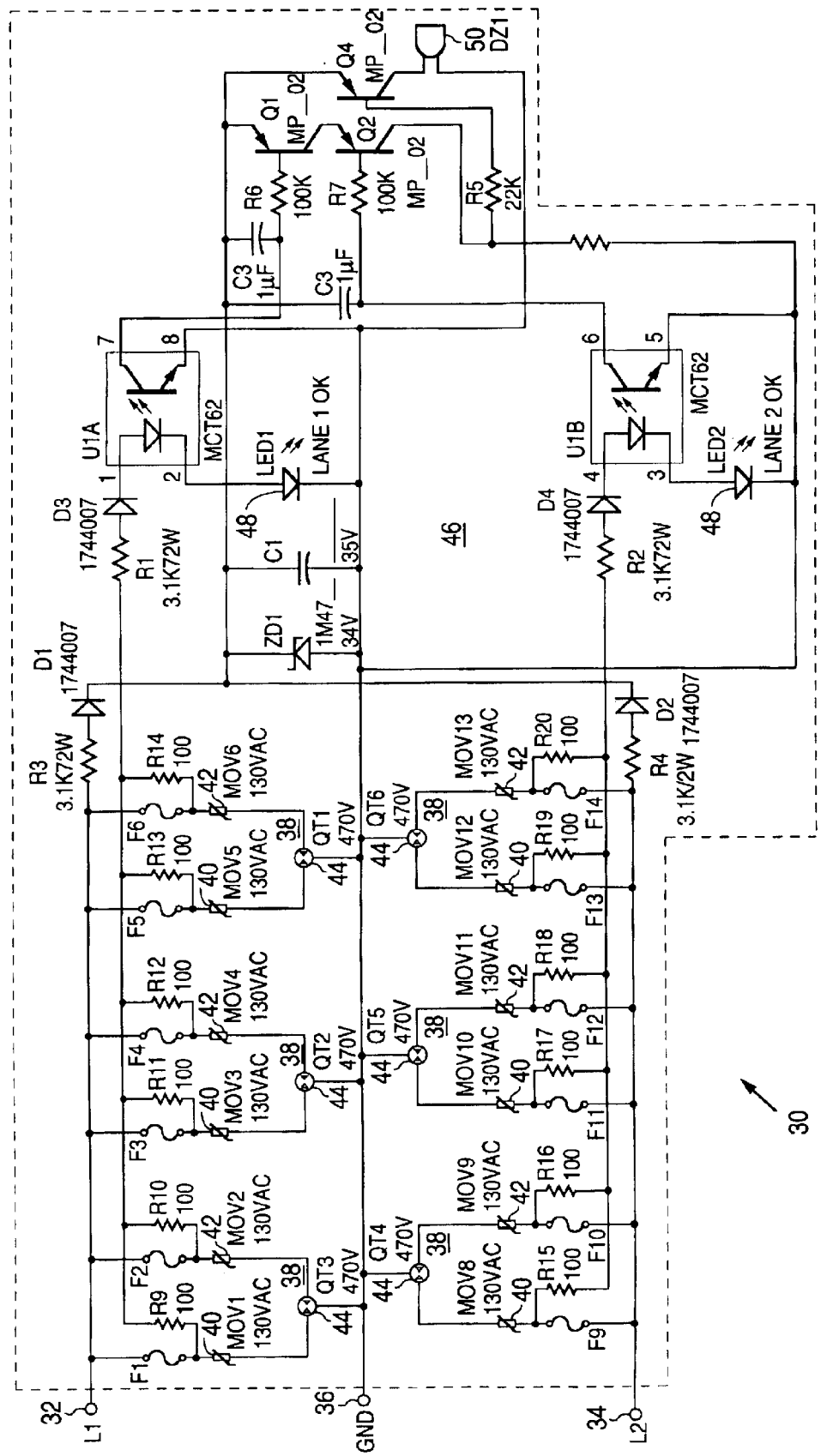
FIG. 2 is a schematic diagram of a surge protector circuit according to the present invention that utilizes six MOV/GDT sub-circuits and has an indicator and alarm circuit.
Figure 3:
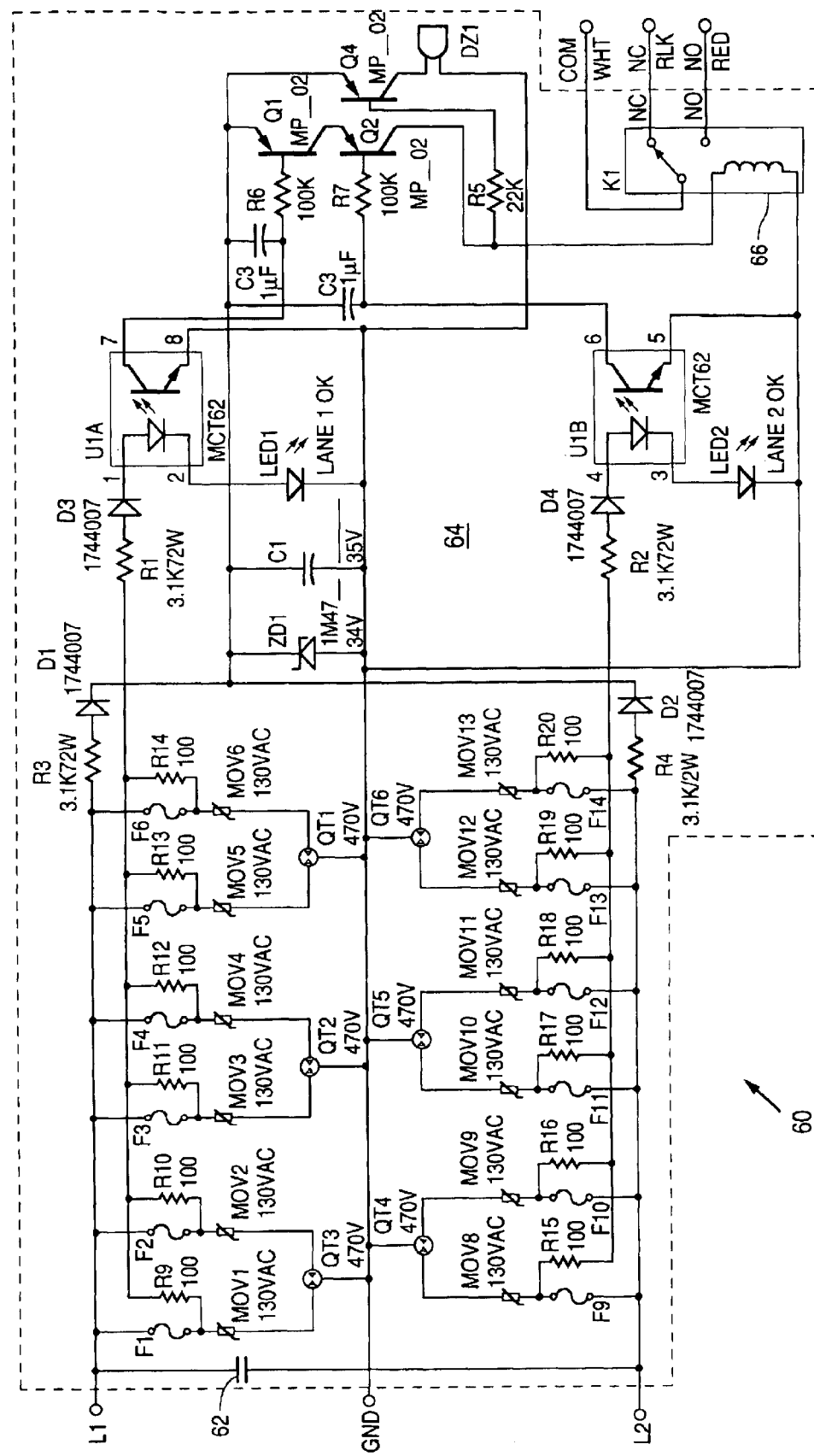
FIG. 3 is a schematic diagram of a surge protector circuit according to the present invention, similar to the circuit of FIG. 2, but further includes an alarm relay and a coupling capacitor.

FIGS. 2 and 3 illustrate two implementations of the present invention. In FIG. 2, the protector circuit 30 is intended to protect two power lines 32 and 34 of a multi-phase power line by providing a shunt path to building ground 36 in the event of power surges. Each power line 32 and 34 has three protector subcircuits 38 connected to the building ground 36. Each protector sub-circuit has two MOVs 40 and 42 and a gas-discharge tube 44. The multiple protector subcircuits 38 of circuit 30 provide a higher current carrying capacity than a single sub-circuit would provide. Preferably, the protector circuit 30 provides protection against surges of greater than 10 kilovolts open circuit and 40,000 amperes short circuit. FIG. 2 also includes an indicator and warning circuit 46 that illuminates LEDs 48 when operation is normal and sounds a buzzer 50 when a fault is detected.

FIG. 3 illustrates a protector circuit 60 of the present invention, which is similar to FIG. 2 but has an additional component, a coupling capacitor 62. The coupling capacitor 62 carries any Power Line Carrier (PLC) high-frequency signals between the power lines. The function of the coupling capacitor 62 is conveniently provided by packaging it together with the protector circuit 60. The capacitor 62 is preferably about 1 microfarad in capacitance. The circuit shown in FIG. 3 also has an indicator and warning circuit 64, like that of FIG. 2, but with an additional signaling relay 66.

Figure 4:
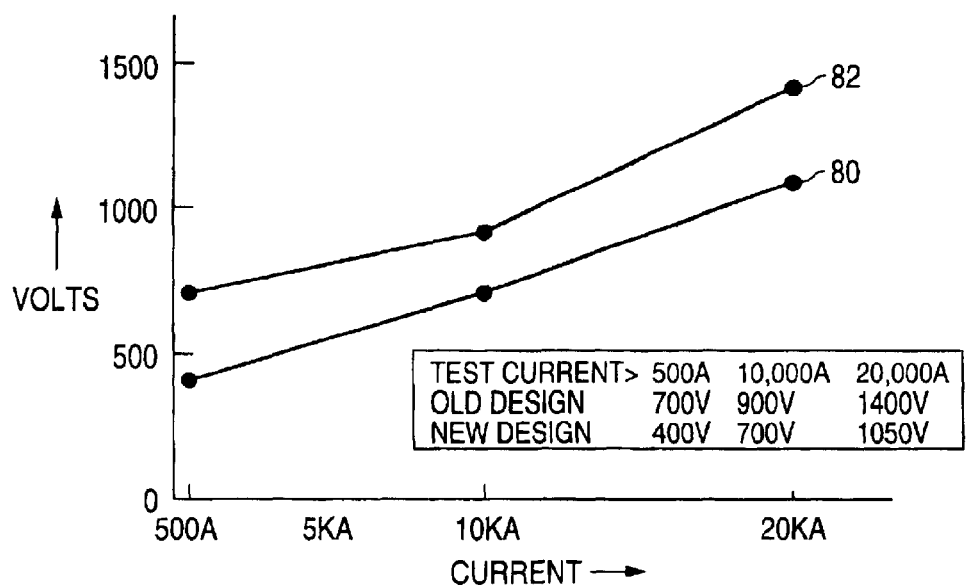
FIG. 4 is a table and graph illustrating the performance of the Ad present invention in comparison to a prior design.

A prior design for permanently-connected AC power protectors that survive a fault condition of 240VAC across the L-G terminals used MOVs with an onset of conduction of 400V. Incorporating the GDT 16 of the present invention makes it possible to use MOVs that begin conducting at only 200V. This difference becomes important when high surge currents are being limited, as shown in FIG. 4. In FIG. 4, the limiting voltage of the present invention is plotted at line 80, and the limiting voltage of a prior circuit is plotted at line 82. Both circuits are capable of withstanding a steady 240VAC voltage without damage. The limiting voltage (80) under surge conditions of the GDT +MOV device of the present invention is significantly lower (i.e., better) than that of the traditional protector (82) with only MOVs. Protectors using the prior art either use MOVs with a high voltage at onset of conduction, (resulting in a high limiting voltage for surges), or use MOVs with ~230V onset of conduction, which makes them vulnerable to sustained 240VAC conditions.

From the above description, it will be apparent that the invention disclosed herein provides a novel and advantageous building-entrance surge protector for single-phase or multi-phase power lines that has a basic protection sub-circuit of a metal-oxide varistor and a gas-discharge tube connected in series between the power line and building ground at a location adjacent to the building entrance. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A permanently-connected building entrance shunting surge protector for a power line to a building having a building ground at a location adjacent to a building entrance, said protector comprising a protector sub-circuit, said protector sub-circuit comprised of a metal-oxide varistor and a gas-discharge tube, said metal-oxide varistor and said gas-discharge tube being connected in series between the power line and the building around at a location adjacent to the building entrance whereby surges on the power line are shunted to the building ground through said series-connected metal-oxide varistor and gas-discharge tube, the gas-discharge tube having two line electrodes and there being two metal-oxide varistors in the protector sub-circuit, with each of the two metal-oxide varistors connected to one electrode of the two line electrodes of the gas-discharge tube respectively, so as to provide paralleling of the metal-oxide varistors between the power line and the building ground through the gas-discharge tube.

2. A surge protector as recited in claim 1 further comprising a coupling capacitor connected between the two power lines at the location adjacent to the building entrance.

3. A surge protector as recited in claim 1 further comprising a third protector sub-circuit connected between the first power line and the building ground, and a fourth protector sub-circuit connected between the second power line and the building ground.

4. A surge protector as recited in claim 1 providing AC power surge protection of greater than 10 kilovolts open circuit and 40,000 amperes short circuit.

5. A surge protector as recited in claim 1 wherein the protector is located within 2 meters of the building ground.

6. A surge protector as recited in claim 1 wherein the inductance between the protector and the building ground is less than 2.5 microhenries.

7. The surge protector as recited in claim 1 characterized in that the power line is a multi-phase power line and that there are multiple protector sub-circuits connected in series between the various phases of the power line and the building ground respectively.

8. The surge protector as recited in claim 1 characterized in that said metal-oxide varistor in series with the gas-discharge tube is connected to the power line.

* * * * *